United States Patent [19]

Bucher et al.

[11] Patent Number: 4,918,991

[45] Date of Patent: Apr. 24, 1990

[54] METHOD FOR SAMPLING NUCLEAR FUEL PELLETS WITH A ROBOT GRIPPER MECHANISM

[75] Inventors: George D. Bucher, McCandless Twp., Allegheny County; John T. DiGrande, Imperial, both of Pa.; Lester C. Frye, Irmo, S.C.; Mark S. Stoutamire, Bridgeville, Pa.

[73] Assignee: Westinghouse Electric Corp., Pittsburgh, Pa.

[21] Appl. No.: 280,867

[22] Filed: Dec. 7, 1988

Related U.S. Application Data

[62] Division of Ser. No. 936,561, Dec. 1, 1986, Pat. No. 4,830,565.

[51] Int. Cl.$^5$ .............................................. G21C 21/00
[52] U.S. Cl. ....................................... 73/864; 376/261
[58] Field of Search ................. 376/261, 260; 414/786, 414/146, 416, 626, 735; 73/864, 864.43; 901/31, 32, 36; 294/906

[56] References Cited

U.S. PATENT DOCUMENTS

| | | |
|---|---|---|
| 3,583,752 | 6/1971 | Panassidi . |
| 3,824,674 | 7/1974 | Inoyama et al. . |
| 3,921,822 | 11/1975 | Dixon . |
| 4,037,731 | 7/1977 | Reis et al. . |
| 4,211,123 | 7/1980 | Mack . |
| 4,234,223 | 11/1980 | O'Neil . |
| 4,266,905 | 5/1981 | Birk et al. . |
| 4,273,506 | 6/1981 | Thompson et al. . |
| 4,348,044 | 9/1982 | Wood, III . |
| 4,412,293 | 10/1983 | Kelley et al. . |
| 4,421,451 | 12/1983 | Higgins . |
| 4,430,923 | 2/1984 | Inaba et al. . |
| 4,687,605 | 8/1987 | Cellier et al. . |
| 4,830,565 | 5/1989 | Bucher et al. ........................ 414/416 |

FOREIGN PATENT DOCUMENTS

| | | | |
|---|---|---|---|
| 0076135 | 4/1983 | European Pat. Off. .............. | 901/33 |
| 0888067 | 12/1981 | U.S.S.R. ............................... | 414/730 |

Primary Examiner—Daniel Wasil

[57] ABSTRACT

A gripper mechanism for sampling nuclear fuel pellets at a predetermined depth in a stack of pellets includes a housing and gripping fingers movably mounted to the housing. The fingers are preferably three relatively thin, arcuate-shaped, blade-like fingers angularly displaced from one another for grasping the pellet at spaced locations about its circumference. The fingers have lower facing surfaces which are brought adjacent to one another for engaging and grasping a pellet when the fingers are moved toward their closed position and retracted remote from one another for disengaging and releasing the pellet when the fingers are moved toward their opened position. Guide members interconnecting the housing with a movable support structure, together with coil springs received about the guide members and extending between the housing and support structure, resiliently and yieldably mount the housing and fingers for movement toward the stack of pellets along a generally linear path ahead of the support structure as the support structure is moved toward the stack. Concurrently the yieldable mounting permits the housing to rock slightly about an axis extending transverse to the linear path for facilitating a burrowing-type movement of the gripping fingers into the stack of pellets to be sampled. Also, a proximity switch detects when the fingers are closed and a load transducer senses when an overload condition has been reached.

9 Claims, 4 Drawing Sheets

METHOD FOR SAMPLING NUCLEAR FUEL PELLETS WITH A ROBOT GRIPPER MECHANISM

This is a division of application Ser. No. 936,561, filed Dec. 1, 1986, now U.S. Pat. No. 4,830,565.

CROSS REFERENCE TO RELATED APPLICATION

Reference is hereby made to the following copending U.S. patent application dealing with related subject matter and assigned to the assignee of the present invention: "Manufacturing Automation System For Nuclear Fuel Rod Production" by Francis Cellier et al, assigned U.S. Ser. No. 702,520 and filed Feb. 19, 1985, now U.S. Pat. No. 4,687,605.

BACKGROUND OF THE INVENTION

1. Field of the Invention

The present invention relates generally to automated article handling and, more particularly, is concerned with a gripper mechanism on a robot manipulator arm and the method of operation thereof for removing individual nuclear fuel pellet samples from different depths in a stack of pellets in a sintering boat.

2. Description of the Prior Art

Manufacture of nuclear fuel in pellet form conventionally involves blending radioactive powder material to the desired chemical composition and then fabricating it into pellets. The properly blended powder is made into pellets by first forming it into slugs, then granulating the slugs and mixing a lubricant with the granulates, and lastly pressing the lubricated granulates into green pellets. The green pellets are compactly stacked in layers in receptacles called furnace boats and fed into a sintering furnace where high temperatures sinter the pellets in a hydrogen atmosphere to achieve the required density and microstructure.

However, it is necessary to select representative pellets from the furnace boats immediately after the sintering operation. It is currently required that sample pellets representing top, middle and bottom layers be taken at random. The sampled pellets are examined to determine density and other characteristics prior to releasing the product for further processing.

Current practice is to select the samples manually; however, sintered pellets are hard, relatively heavy, ceramic cylinders with sharp edges. When confined to a container, such as a furnace boat, the pellets tend to form a compact array that is difficult to penetrate. Obtaining samples manually from anywhere but the surface layer is physically difficult, requiring the operator to thrust or "worm" his or her fingers down through the massed pellets.

Also, steps are underway to automate pellet manufacturing lines, such as generally described in the application cross-referenced above, which will make manual access to internal pellet samples even more difficult. For example, automated boat loaders are being implemented to achieve a greater compaction of pellets within the boat by arranging the pellets in interlocking vertical stacks. Further, larger and deeper boats are being used. Conventional boat designs accommodate approximately 1000 pellets, whereas the new boats used in automated operations hold approximately 6000 pellets. Accordingly, a greater number of samples will be required from each boat, but the difficulty in obtaining manual access to the lower layers will be compounded.

Mechanisms for automated handling of articles of various sizes and shapes are known in the prior art. Representative of the prior art are the mechanisms disclosed in U.S. Pats. No. (3,583,752), to Panissidi Mack (4,211,123), O'Neil (4,234,223), Birk et al (4,266,905), Thomson et al (4,273,506), Wood (4,348,044) and Higgins (4,421,451). While many of these mechanisms achieve their objectives under the range of operating conditions for which they were designed, most would seem to be unsuitable in terms of the versatility of their operating capabilities for sampling nuclear fuel pellets from a compact layered stack thereof contained in a boat.

Consequently, a need still exists for a suitable automated mechanism and technique to sample nuclear fuel pellets from layers at different depths within the furnace boat in a consistent, repeatable way without damaging the pellets contained therein.

SUMMARY OF THE PRESENT INVENTION

The present invention provides a robot gripper mechanism and method of sampling nuclear fuel pellets designed to satisfy the aforementioned needs. The gripper mechanism of the present invention is part of an automated sub-system incorporated in the manufacturing system disclosed in the cross-referenced application for automated fuel rod production. Specifically, the gripper mechanism and gripper sampling method in conjunction with a robotic manipulator arm, such as a PUMA 560 robot, automatically select individual nuclear pellets from various locations and depths within the stacked, layered load of pellets in the sintering furnace boat. Each pellet is then moved through successive stations of an interfacing automatic density measurement sub-system by the same robot.

Advantageously, the gripper mechanism and sampling method of the present invention eliminates the human factor from the sampling process which assures the integrity and consistency of a difficult sampling operation. Also eliminated are the hazards associated with manual sampling where the operator is required to work his or her hand down through several inches of sharp, radioactive ceramic pellets to secure samples from middle and bottom layers. Consonant with functional requirements of the overall automated fuel rod manufacturing system, the present invention provides unattended automated sampling which improves productivity, permits safe selection of greater sample quantities from larger boats being machine loaded to greater load densities without emptying the contents for manual sampling, and maintains sample-to-boat tracking for data analysis and product traceability.

Accordingly, the present invention sets forth a gripper mechanism for locating and grasping a nuclear fuel pellet at a predetermined depth in a stack thereof. The gripper mechanism comprises: (a) a housing; (b) gripping means mounted to the housing and being movable toward and away from respective closed and opened positions for respectively engaging and disengaging the pellet to correspondingly grasp and release the same; (c) actuating means mounted to the housing and coupled to the gripping means, the actuating means being operable for moving the gripping means between its closed and opened positions; (d) means for detecting when the gripping means is disposed at its closed position; and (e) means supporting the housing and the gripping means mounted thereto for movement toward and away from the stack of pellets to be sampled for moving the gripping means into and from the stack, the supporting means also resiliently and yieldably mounting the housing so as to allow concurrent lateral rocking of the housing as the gripping means is moved into and from the stack of pellets.

More particularly, the gripping means includes a plurality of gripping fingers movably mounted to and depending from the housing. The fingers are movable between the closed and opened positions and have respective lower engaging surface portions. The engaging surface portions are brought adjacent to one another for engaging a pellet therebetween when the fingers are moved toward their closed position and are retracted remote from one another for disengaging a pellet when the fingers are moved toward their opened position.

Further, means is provided for sensing the load applied to the stack of pellets by the gripping means. The sensing means in the form of a load-sensing transducer is capable of generating a signal indicating that an overload condition has been reached. Additionally, the means resiliently mounting the housing includes a support structure being movable toward and away from the stack of pellets, a plurality of guide members connected to one of the housing and the support structure and slidable relative to the other thereof, and a plurality of coil springs. Each coil spring is received about one of the guide members and extends between the housing and support structure. The springs are resiliently yieldable for moving the housing and gripping means toward the stack of pellets along a generally linear path ahead of the support structure as the support structure is moved toward the stack, while concurrently permitting the housing to rock about an axis extending transverse to the linear path for facilitating burrowing-type movement of the gripping means into the stack of pellets.

The actuating means is a power transmitting cylinder mounted to the housing and having an extendible and retractible piston rod and a spindle mounted to its terminal end. The spindle is coupled to the gripping means for moving the gripping means toward its closed and opened positions upon retraction and extension of the piston rod into and from the cylinder. The detecting means is a proximity switch mounted on the housing for detecting the position of the piston rod.

The present invention also relates to a method of sampling a stack of nuclear fuel pellets at a predetermined depth in the stack, comprising the steps of: (a) locating a plurality of angularly displaced gripping fingers above the stack; (b) opening lower end portions of the gripping fingers; (c) burrowing the gripping fingers into the stack until the lower end portions thereof are located at the predetermined depth in the stack; (d) closing the lower end portions of the fingers to grasp a pellet located at the predetermined depth; and (e) withdrawing the fingers upwardly from the stack of pellets. More particularly, the burrowing step includes: (i) lowering the fingers into the stack of pellets toward the predetermined depth therein; (ii) rotating the fingers in a first direction relative to the stack and at a first predetermined speed concurrently as the fingers are being lowered into the stack; (iii) pausing the lowering of the fingers; (iv) rotating the fingers in a second direction opposite to the first direction relative to the stack and at a second predetermined speed faster than the first speed concurrently as the fingers are paused; and (v) repeating steps (i) through (iv) until the desired predetermined depth is reached. Also, during at least one interval when the fingers are paused, the fingers are rotated multiple times in opposite directions to stir the stack of pellets so as to facilitate further lowering of the fingers into the stack.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
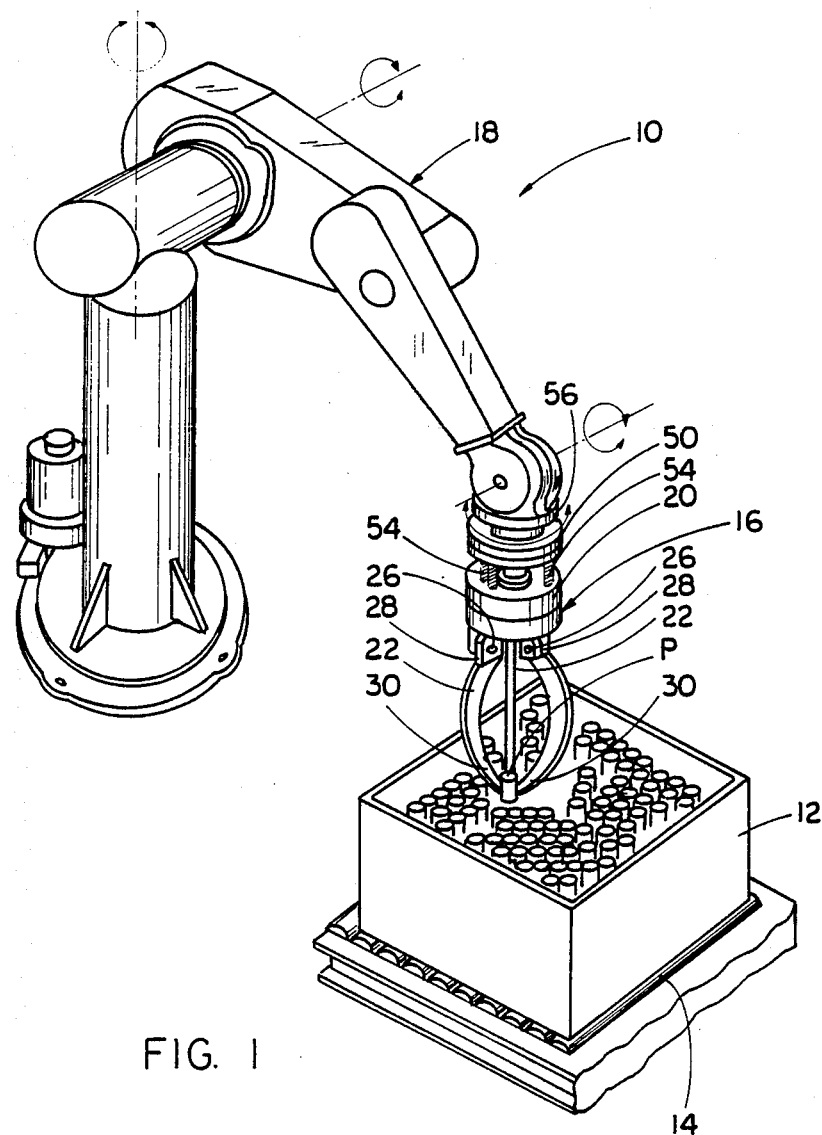
FIG. 1 is a perspective view of a robotic manipulator arm with the robot gripper mechanism of the present invention thereon grasping a sample nuclear fuel pellet taken from a compact, layered stack of pellets contained in a sintering boat.
Figure 2:
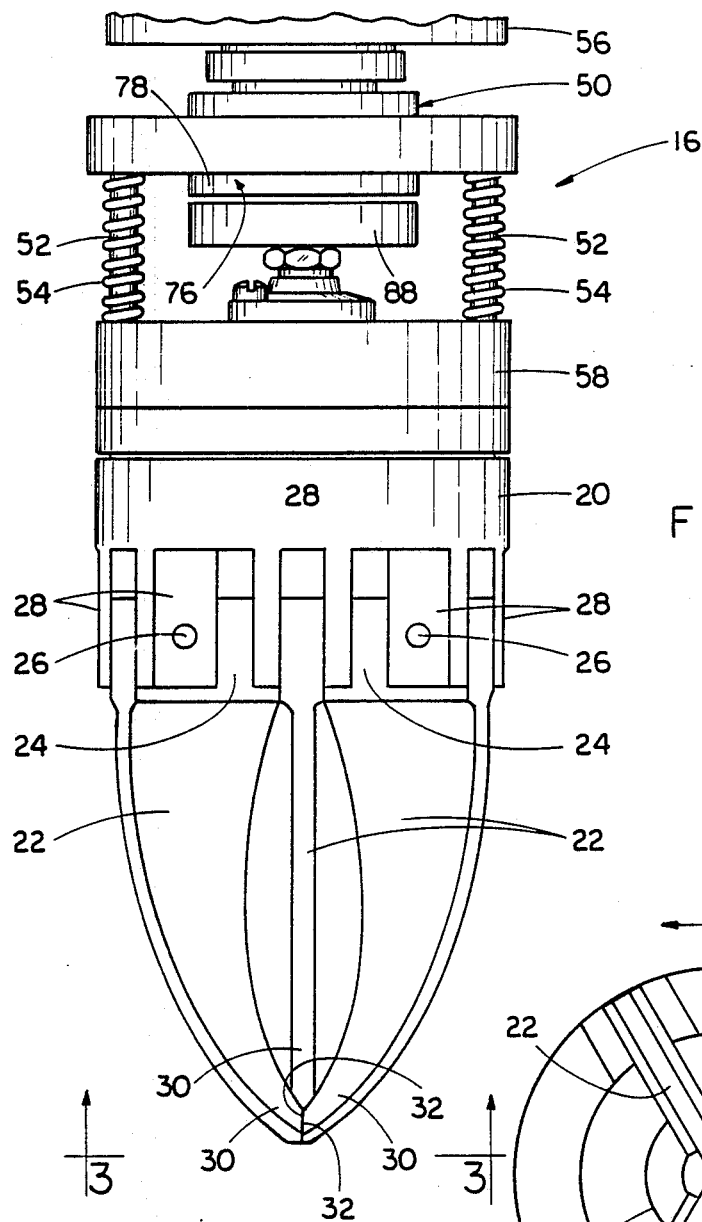
FIG. 2 is an enlarged elevational view of the gripper mechanism of FIG. 1, showing the gripping fingers of the mechanism being disposed in a closed position without a pellet being grasped therebetween.
Figure 3:
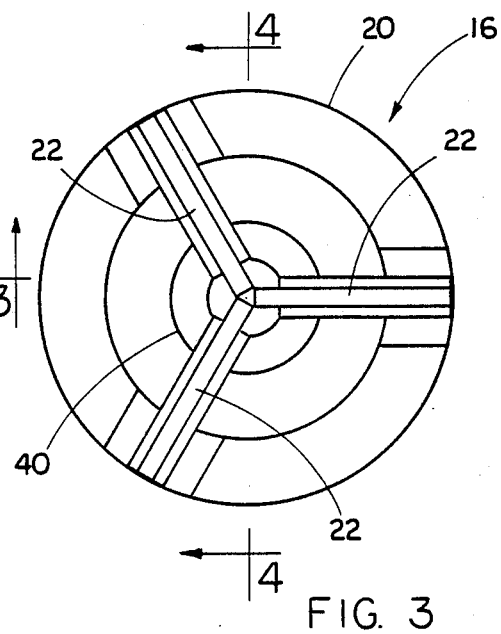
FIG. 3 is a bottom plan view of the gripper mechanism as seen along line 3—3 of FIG. 2.
Figure 4:
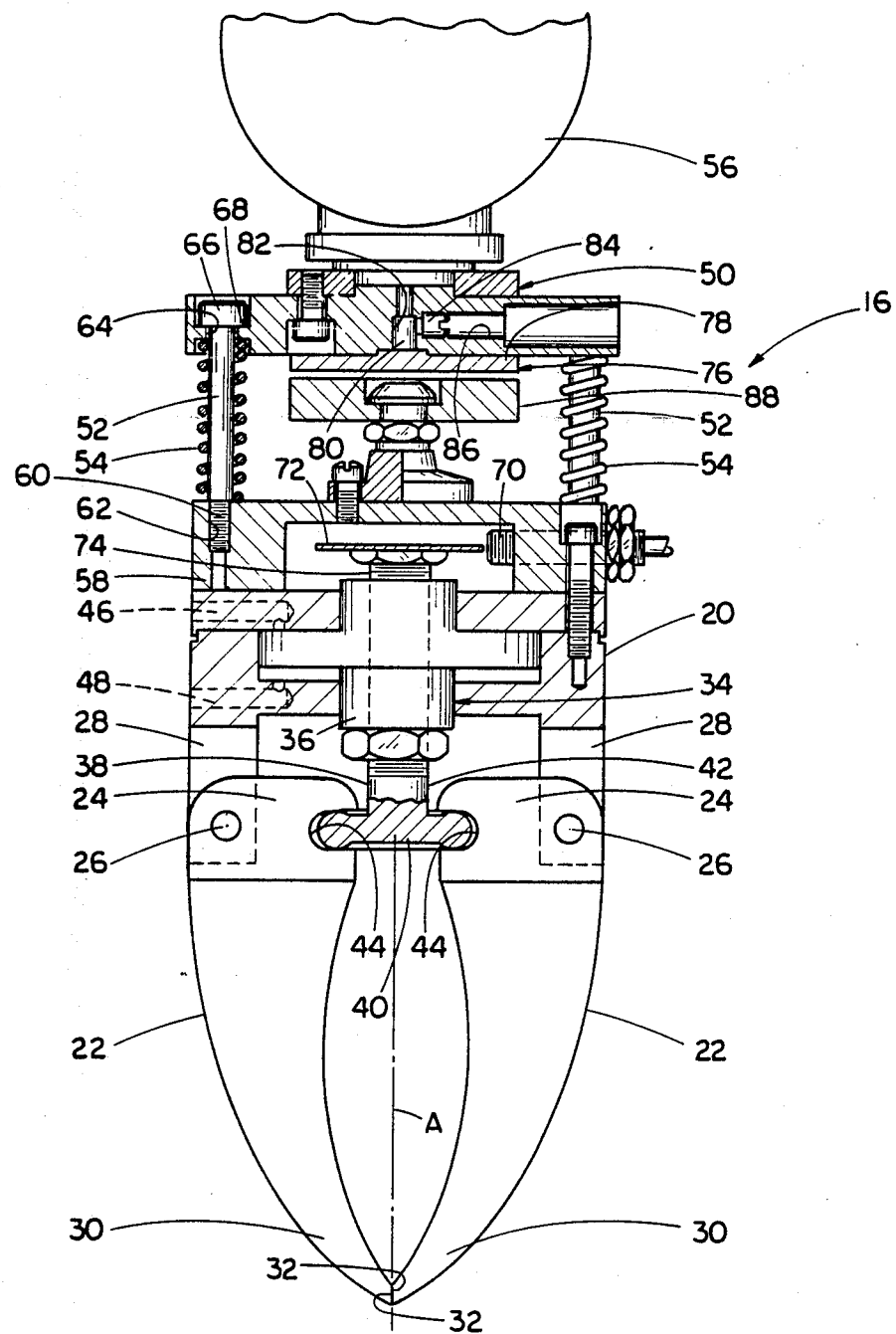
FIG. 4 is a view of the gripper mechanism similar to that of FIG. 2, but showing the gripper mechanism in partially sectioned form.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a sampling station, generally designated 10, of an automated fuel rod manufacturing system, such as generally disclosed in the application cross-referenced above. The sampling station 10 is located down-stream of the discharge end of a sintering furnace from which a boat 12 loaded with sintered pellets P, being contained in a tightly compact, layered stack therein, is automatically transported by a conveyor 14 to the station 10. At the sampling station 10, representative ones of the sintered pellets P in the boat 12 are randomly sampled from different depths of the boat in accordance with a prescribed sampling plan and their density and other characteristics inspected.

The sampling is carried out by the robot gripper mechanism 16 of the present invention being mounted on the terminal end of a robotic manipulator arm, generally indicated 18, located in the sampling station 10 adjacent the conveyor 14. The gripper mechanism 16 is operable in a sequence of gripper movements which constitute the steps of the pellet sampling method of the present invention. In one representative example, to operate the gripper mechanism 16 the manipulator arm 18, a multi-axes device such as a PUMA 560 robot arm, is combined with a suitable controller, such as a LSI-11 computer, external storage (floppy disk), programming device (teach pendant), CRT console and a four way pneumatic solenoid gripper control. Since other arrangements of suitable commercially-available components can be used to operate the gripper mechanism 16, the aforementioned components associated with the manipulator arm 18, not comprising any part of the present invention, need not be illustrated nor described herein in order for one skilled in the art to gain a complete and thorough understanding of the gripper mechanism 16 and its mode of operation.

Robot Gripper Mechanism

Turning now to FIGS. 2-5, there is shown the preferred embodiment of the robot gripper mechanism 16 of the present invention. The gripper mechanism 16, adapted to gently burrow into a compact stack of pellets P and grasp one located at a predetermined depth in the boat 12, basically includes a housing 20 and a plurality of elongated gripping fingers 22 pivotally mounted at their upper ends 24 by pins 26 to spaced pairs of tabs 28 on the lower periphery of the housing 20.

Figure 5:
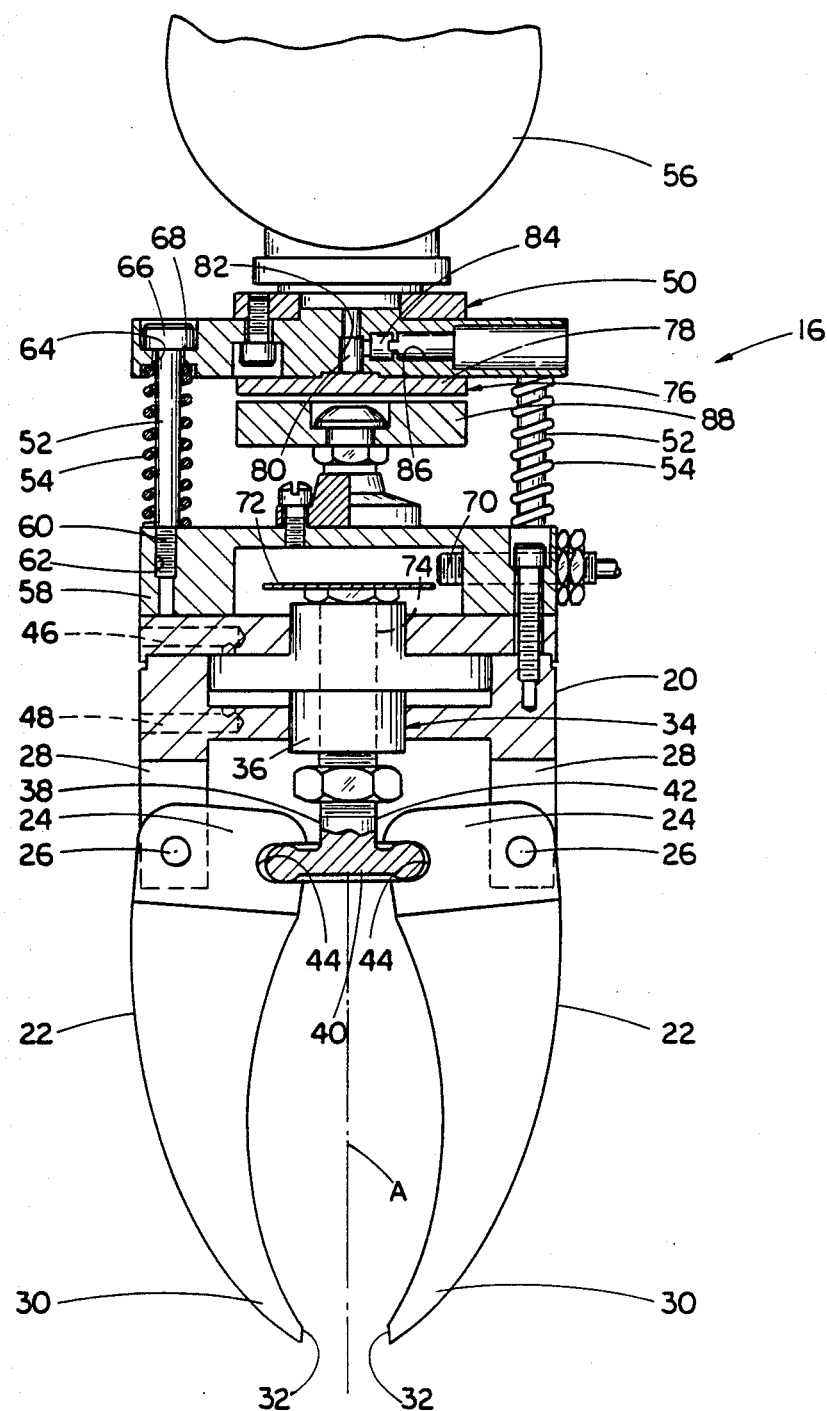
FIG. 5 is a view of the gripper mechanism similar to that of FIG. 4, but showing the gripping fingers of the mechanism being disposed in an opened position.

More particularly, the gripping fingers 22 are preferably three relatively thin, arcuate-shaped, blade-like fingers. As in the case of the pairs of tabs 28, the fingers 22 are angularly displaced generally equally from one another, for example 120 degrees apart, for grasping the cylindrical pellet P in the stack at three equidistantly spaced locations about the circumference of the pellet. By their pivotal mounting to the tabs 28 about axes which extend generally parallel to vertical planes extending tangential to the circumference of the cylindrical pellet to be grasped, the gripping fingers 22 are thus pivotally movable between inner closed and outer opened positions, respectively depicted in FIGS. 4 and 5. The gripping fingers 22 have respective lower ends 30 with generally vertical, pellet engaging surfaces 32 facing toward one another. The finger surfaces 32 are brought adjacent to one another for engaging and grasping a pellet P (see FIG. 1) therebetween when the fingers 22 are moved toward their closed position (FIGS. 3 and 4) and are retracted remote from one another for disengaging and releasing the pellet when the fingers 22 are moved toward their opened position (FIG. 5).

For moving the gripping fingers 22 toward and away from their closed and opened positions, the gripping mechanism 16 includes actuating means in the form of an air cylinder 34, although other suitable devices could be used, mounted to the housing 20 and coupled to the upper ends 24 of the gripping fingers 22. The air cylinder 34 has a power-transmitting cylinder portion 36 attached to the housing 20 and a piston rod 38 mounted in the cylinder portion and extendible and retractible relative thereto. The piston rod 38 has a circular disc or spindle 40 mounted to its lower terminal end 42 and coupled in inwardly facing arcuate notches 44 formed in the upper ends 24 of the gripping fingers 22 inwardly from the location of pivot pins 26. The housing 20 is provided with air inlet and outlet ports 46,48 in communication with the cylinder portion 36 through which pressurized air is routed from any suitable source (not shown) for extending and retracting the piston rod 38. The gripping fingers 22 are concurrently pivoted toward and away from their closed and opened positions upon movement of the piston rod 38 relative to the cylinder portion 36 between retracted and extended positions, respectively seen in FIGS. 4 and 5.

For moving the housing 20 and gripping fingers 22 mounted thereon toward and away from the stack of pellets P contained in the boat 12, the gripper mechanism 16 includes a support structure in the form of a mounting flange assembly 50, a plurality of connecting guide members 52 and a plurality of resilient flexible members in the form of coil springs 54. The mounting flange assembly 50 is connected to the outer end 56 of the manipulator arm 18 for rotation about a central axis A of the gripper mechanism 16, allowing the fingers 22 of the mechanism 16 not only to be moved toward and away from the stack of pellets but also rotated relative to the stack concurrently with such movement.

The guide members 52 are spaced apart preferably 90 degrees and extend between the flange assembly 50 and a mounting base 58 of the housing 20. The threaded bottom ends 60 of the guide members 52 are threaded into holes 62 tapped in the housing mounting base 58. The guide members 52 slidably fit through openings 64 in the flange assembly 50 which are spaced apart in alignment with the holes 62. The upper ends of the guide members 52 have enlarged diameter heads 66 which are sized to seat on ledges 68 formed on the flange assembly 50 within the openings 64 therein so as to suspend the housing 20 below the flange assembly. Further, each of the coil springs 54 is compressed and disposed about one of the guide members 52 and extends between the housing base 58 and the flange assembly 50 so as to dispose the housing 20 at a maximum distance from the assembly 50 with the guide member heads 66 seated on the ledges 68. However, as would be expected, the coil springs 54 are independently resiliently yieldable for allowing angularly displaced portions of the housing 20 to move toward the flange assembly 50 and in such manner impart a lateral rocking motion to the housing about axes located within a plane extending transverse to the longitudinal axis A of the gripper mechanism 16. Such mounting relationship of the housing 20 to the flange assembly 50 allows the housing and gripping fingers 22 to be moved by the arm 18 toward the stack of pellets, for instance, along a generally linear path ahead of the flange assembly 50 as the latter is moved toward the stack, while concurrently permitting the housing 20 to rock slightly about axes within the plane extending transverse to the linear path, facilitating a burrowing-type movement of the gripping fingers 22 into the stack of pellets to be sampled.

The gripper mechanism 16 further includes means in the form of a proximity sensor or switch 70 mounted on the housing 20 for detecting when the gripping fingers 22 are disposed at their inner closed position. Specifically, when the proximity switch 70 detects the presence of a washer 72 which is mounted on the upper end 74 of the piston rod 38, this indicates that the gripping fingers 22 are at their closed position.

Since it is extremely important not to damage any of the pellets during lowering of the gripping fingers 22 into the stack, the gripper mechanism 16 also incorporates means in the form of a load-sensing transducer 76 mounted on the flange assembly 50 for sensing the load applied to the pellets by the fingers. The transducer 76 is capable of generating a signal indicating that an overload condition has been reached. In particular, the transducer 76 has circular disk portion 78 of a generally planar shape and a central stem 80 received in a central bore 82 of the mounting flange assembly 50 and secured therein by a set screw 84 threaded into an internally threaded passageway 86 which intersects with the central bore 82. The disk portion 78 of the transducer 76 extends in generally transverse relation to the direction of movement of the gripper mechanism 16 toward and away from the pellet stack. The housing 20 has a generally planar leveling pad 88 mounted thereto above its mounting base 58 and also extending in generally transverse relation to the direction of movement of the gripper mechanism 16. Upon yielding of the coil springs 54, the leveling pad 88 of the housing 20 will engage the planar disk portion 78 of the transducer 76 and impose on the transducer the load being transmitted to the gripping fingers 22 to move it into the pellet stack. The output of the transducer 76 will indicate whenever an unsatisfactory preselected level of load is reached.

Nuclear Fuel Pellet Sampling Method

The above-described gripper mechanism 16 is used to sample a stack of nuclear fuel pellets P generally at several different predetermined depths in the stack while the same remains in the boat 12. The manipulator arm 18 initially locates the angularly displaced gripping fingers 22 more or less directly above the stack, with their lower ends 30 in opened position, as seen in FIG. 5. The manipulator arm 18 is then operated to burrow the gripping fingers 22 into the stack until their lower ends 30 are located at the desired predetermined depth in the stack. Next, the air cylinder 34 is actuated to retract the piston rod 38 and move the lower ends 30 of the fingers toward their closed position in order to grasp a pellet located at the predetermined depth between the surfaces 32 on the fingers, such as seen in FIG. 1. If the proximity switch 70 does not detect the presence of the washer 72, then one knows that a pellet has been successfully grasped by the fingers. Finally, the manipulator arm 18 is operated to withdraw the fingers 22 and sampled pellet upwardly from the stack of pellets.

More particularly, gentle burrowing of the fingers 22 is achieved as follows. First, the fingers 22 are lowered into the stack of pellets through a first predetermined increment of the distance to the predetermined depth therein and concurrently rotated relative to the stack, such as in a clockwise direction, at a relatively slow speed. Once the fingers 22 have traveled through the first increment of distance, travel is stopped and the fingers 22 pause in their descent while they are rotated counterclockwise in the stack at a relatively faster speed. Thereafter, their descent into the stack continues for a second increment of distance as they are again concurrently rotated slowly. Then, their descent stops and they are rotated faster. This sequence is again repeated until they reach the desired predetermined depth. In addition, during at least one interval when the fingers 22 are pausing in their descent, they are rotated several times in opposite directions to stir the stack of pellets so as to facilitate their further lowering deeper into the stack.

It is preferred that individual pellet samples be removed at the sampling station 10 from different depths in the boat 12 in accordance with a preprogrammed sampling plan. The number of samples selected and their locations and depths can be easily varied at a console (not shown) of the sampling sub-station. The substation functions automatically initiating various burrowing and seeking routines until the sample has been retrieved. Sampling points in one exemplary sampling plan are established at ¾, 2 and 3¼ inches from the bottom of the boat 12.

By way of example, one actual sampling sequence is as follows. At the sampling station 10, the manipulator arm 18 moves the gripper mechanism 16 to a position above the first programmed sampling point, clear of the boat 12 with the gripping fingers 22 opened and pointing down. The sampling depth is identified with respect to a "0" reference level established as a preprogrammed distance above the floor of the boat. Then, the gripper mechanism 16 is lowered slowly to a point just above the pellet stack (55mm above "0") and then rotates rapidly 25 degrees in a clockwise direction.

For approaching a first predetermined depth, lowering continues for successive programmed increments (10mm, 5mm, 5mm). As each increment is approached the gripper mechanism 16 and fingers 22 are rotated slowly 25 degrees counterclockwise during the descent, then pauses at each increment and rotates rapidly 25 degrees clockwise. In its final approach to the first designated depth (30mm above "0") the gripper mechanism 16 lowers an additional increment (5mm) while rotating slowly 25 degrees counterclockwise. If a sample pellet is to be selected at this first depth, the gripper mechanism 16 executes a grasp action to be explained shortly.

When directed by the sub-system controller to approach a second deeper predetermined depth, the robotic manipulator arm 18 causes the gripper mechanism 16 to execute the steps required to reach the first depth as just described and then continues by rotating quickly 25 degrees alternately clockwise and counterclockwise for nine consecutive motions while remaining at the same level (30mm). This stirring action is necessary to disturb the pellet stack and permit the gripping fingers 22 to enter deeper into the stack. Burrowing of the gripping fingers resumes for successive programmed increments (2.5mm, 2.5mm) with slow 25 degree counterclockwise rotation during descent and rapid 25 degree clockwise rotation at each increment. Terminating at the second designated depth (25mm above "0"), the gripper mechanism 16 executes a "grasp" of a sample pellet.

In approaching a third still deeper predetermined depth, the arm 18 executes the steps described for the first and second depths and continues the normal motion sequence of slow 25 degree clockwise rotation during descent and rapid 25 degree counterclockwise rotation at each increment level (2.5mm, 2.5mm, 2.5mm, 3.0mm and 2.5mm), terminating at the third and deepest depth (10mm above "0") with a "grasp".

If either the preset limit (normally 7 pounds) on the transducer 76 or a time delay is exceeded at any time, the arm 18 ceases the burrowing action by the gripper mechanism 16 and withdraws 150mm. The timer automatically resets and the burrowing cycle is reinitiated. If after three attempts the designated depth has not been attained, the arm withdraws 150mm, an alarm signal is sent to the control room and a message appears on the CRT.

When the "grasp" command is executed, the air cylinder 34 in the gripper mechanism housing 20 is pressurized causing the fingers 22 to close. If a pellet is secured between the finger surfaces 32, as will be indicated by failure of the washer 72 to activate the proximity switch 70, the arm 18 then slowly withdraws and proceeds to execute the "shake out" subroutine described below. If the washer 72 has sufficient travel to activate the proximity switch 70, a signal is provided to the sub-system controller indicating that a pellet has not been secured and the "grasp failed" subroutine is initiated as follows. The controller opens the fingers 22 and withdraws the gripper mechanism 5mm without rotation. The gripper mechanism 16 is then rotated 50 degrees clockwise, lowered 5mm and rotated 50 degrees counterclockwise simultaneously, lowered 5mm without rotation, raised 5mm without rotation and then executes "grasp" at the original programmed level. If after seven repetitions a pellet still has not been secured the gripper mechanism is withdrawn 100mm, an alarm signal is sent to the control room and a message appears on the CRT. This occurrence is generally caused by a partial or grossly uneven boat load.

To remove multiple or extraneous pellets that become entrapped among the fingers 22 (approximately a 5% occurrence) a "shake out" or "invert" sub-routine is employed after the gripper mechanism 16 has moved clear of the boat. The arm 18 is rotated at its "wrist bend" axis such that the gripper mechanism 16 is oriented horizontally above the boat; the gripper mechanism is then lowered while in the horizontal position to reduce pellet freefall distance and rotated 90 degrees at the flange assembly 50 causing unsecured pellets to drop off. The arm 18 then raises and rotates the gripper mechanism back to a vertical, downward pointing, orientation clear of the boat. It then swings the gripper mechanism to the release position at the pellet orientation station of the adjacent density measurement subsystem. The status of the proximity sensor or switch 70 is monitored by the sub-system controller initially and again before pellet release to assure that a pellet has been secured and not subsequently dropped. If the pellet is not present for release, a timer causes the cycle to abort and resample.

It is thought that the present invention and many of its attendant advantages will be understood from the foregoing description and it will be apparent that various changes may be made in the form, consturction and arrangement thereof without departing from the spirit and scope of the invention or sacrificing all of its material advantages, the form hereinbefore described being merely a preferred or exemplary embodiment thereof.

We claim:

1. A method of sampling a stack of nuclear fuel pellets at a predetermined depth in the stack, comprising the steps of:
   (a) locating a plurality of angularly displaced mechanical gripping fingers above the stack;
   (b) opening lower end portions of said gripping fingers;
   (c) burrowing said gripping fingers into the stack until said lower end portions thereof are located at the predetermined depth in the stack, said burrowing including
      (i) lowering said fingers into the stack of pellets toward the predetermined depth therein; and
      (ii) rotating said fingers in a first direction relative to the stack and at a first predetermined speed concurrently as said fingers are being lowered into the stack;
   (d) closing said lower end portions of said fingers to grasp a pellet located at the predetermined depth; and
   (e) withdrawing said fingers upwardly from the stack of pellets.

2. The sampling method as recited in claim 1, wherein said burrowing step further includes:
   (iii) pausing said lowering of said fingers; and
   (iv) rotating said fingers in a second direction opposite to said first direction relative to the stack and at a second predetermined speed faster than said first speed concurrently as said fingers are paused.

3. The sampling method as recited in claim 2, wherein said burrowing step still further includes:
   (v) repeating steps (i) through (iv) until said desired predetermined depth is reached.

4. A method of gently burrowing a plurality of angularly displaced gripping fingers into a stack of nuclear fuel pellets and grasping a pellet located at a predetermined depth in the stack, comprising the steps of:
   (a) lowering said fingers into the stack of pellets toward the predetermined depth therein;
   (b) rotating said fingers in a first direction relative to the stack and at a first predetermined speed concurrently as said fingers are being lowered into the stack;
   (c) pausing said lowering of said fingers;
   (d) rotating said fingers in a second direction opposite to said first direction relative to the stack and at a second predetermined speed faster than said first speed concurrently as said fingers are paused;
   (e) repeating steps (a) through (d) until said desired predetermined depth is reached; and
   (f) closing said fingers upon reaching said predetermined depth to grasp a pellet located at said depth in the stack of pellets.

5. The burrowing method as recited in claim 4, further comprising the step of:
   during at least one interval when said fingers are paused, rotating said fingers multiple times in opposite directions to stir the stack of pellets so as to facilitate further lowering of said fingers into the stack.

6. A method of gently burrowing a plurality of angularly displaced gripping fingers into a stack of nuclear fuel pellets for grasping a pellet located at a predetermined depth in the stack, comprising the steps of:
   (a) lowering said fingers into the stack of pellets toward the predetermined depth therein;
   (b) rotating said fingers in a first direction relative to the stack and at a first predetermined speed concurrently as said fingers are being lowered into the stack;
   (c) pausing said lowering of said fingers; and
   (d) rotating said fingers in a second direction opposite to said first direction relative to the stack concurrently as said fingers are paused.

7. The burrowing method as recited in claim 6, further comprising the step of:
   (e) repeating steps (a) through (d) until said desired predetermined depth is reached.

8. The burrowing method as recited in claim 7, further comprising the step of:
   during at least one interval when said fingers are paused, rotating said fingers multiple times in opposite directions to stir the stack of pellets so as to facilitate further lowering of said fingers into the stack.

9. The burrowing method as recited in claim 7, wherein said fingers are rotated in said second direction at a second predetermined speed faster than said first speed concurrently a said fingers are paused.

* * * * *